Nov. 22, 1960

T. LAFITTE 2,960,879

POSITIVELY OPERATED STARTING DEVICE FOR STARTING MOTORS

Filed Oct. 1, 1957

INVENTOR
THEODORE LAFITTE
By Linton and Linton
ATTORNEYS

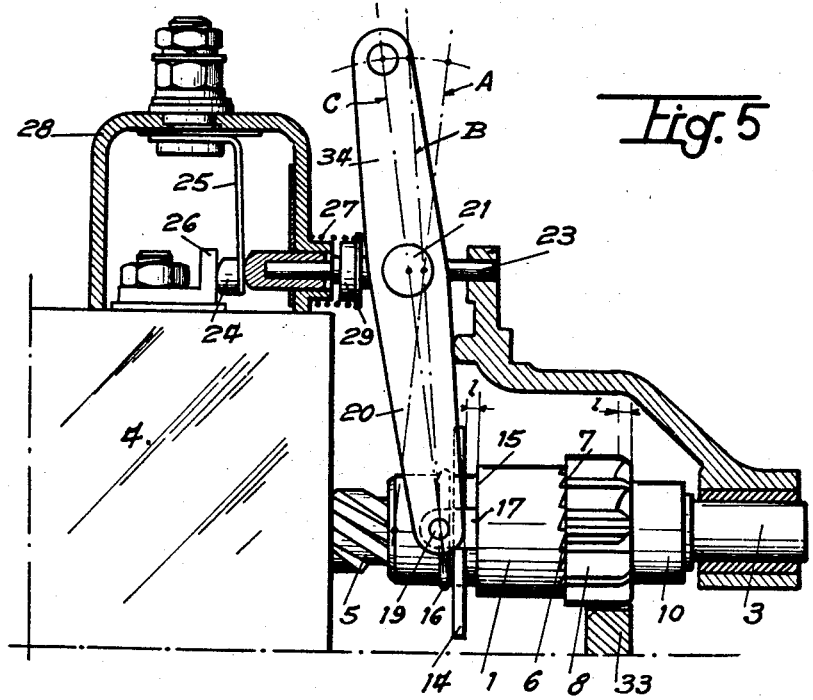

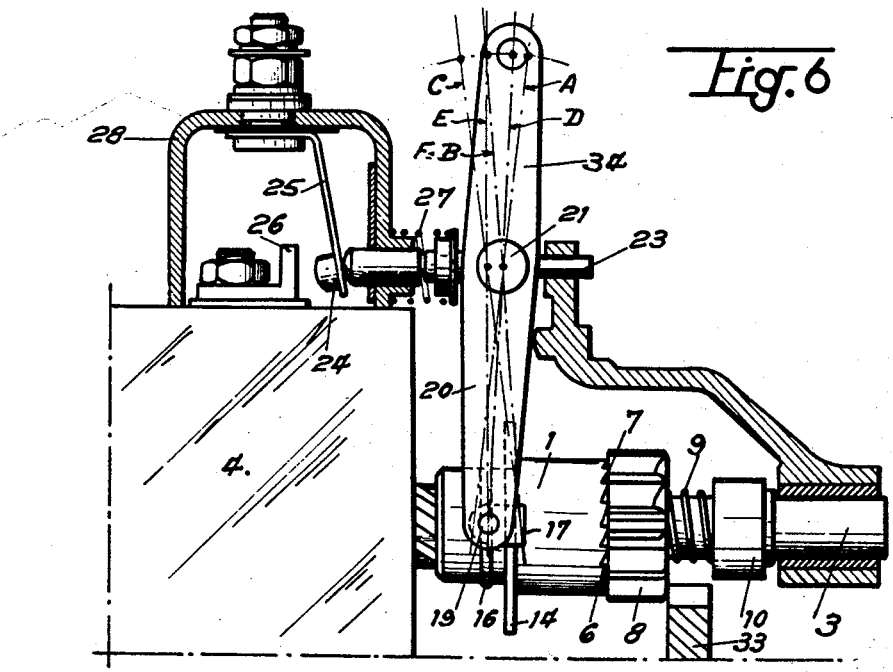

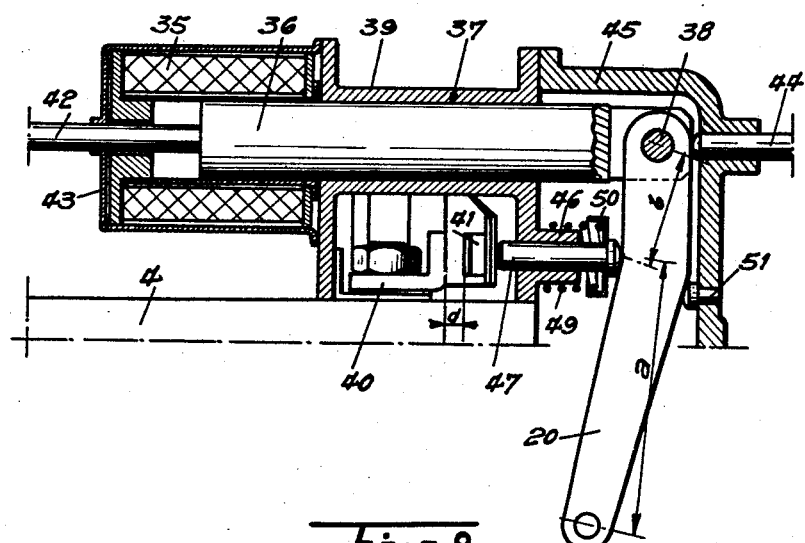
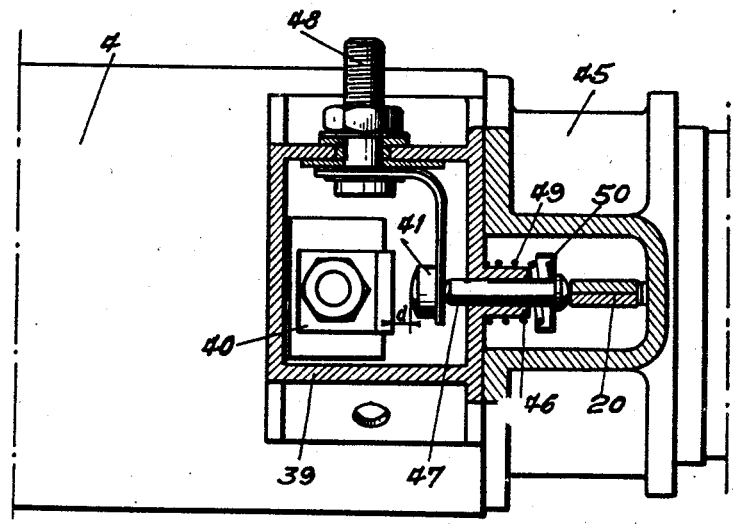

Nov. 22, 1960
T. LAFITTE
2,960,879
POSITIVELY OPERATED STARTING
DEVICE FOR STARTING MOTORS
Filed Oct. 1, 1957
6 Sheets-Sheet 5
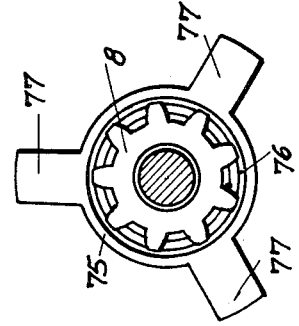
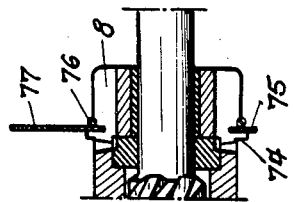
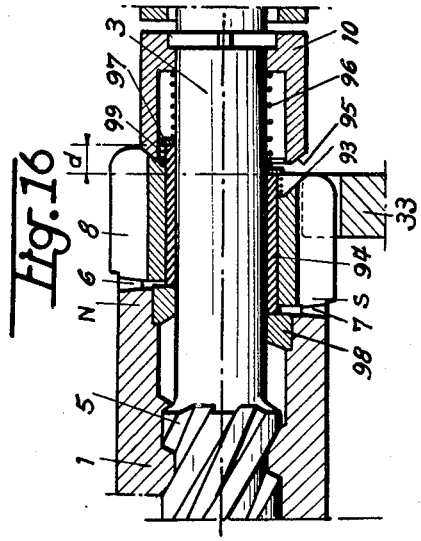
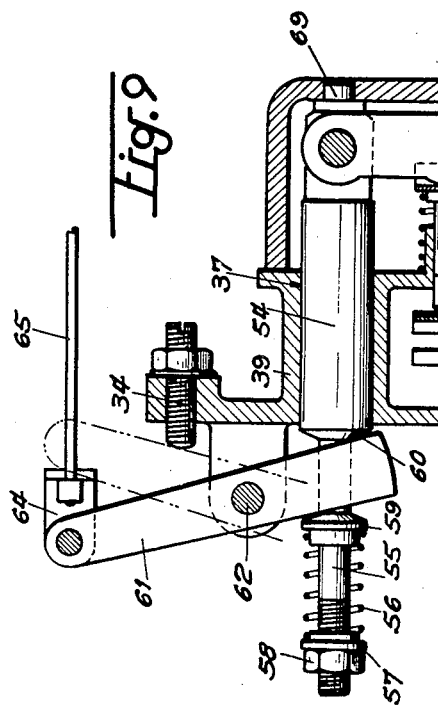
INVENTOR
THEODORE LAFITTE
By *Linton and Linton*
ATTORNEYS Nov. 22, 1960
T. LAFITTE
2,960,879
POSITIVELY OPERATED STARTING
DEVICE FOR STARTING MOTORS
Filed Oct. 1, 1957
6 Sheets-Sheet 6
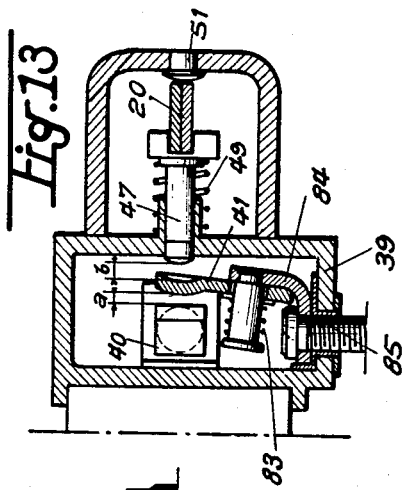
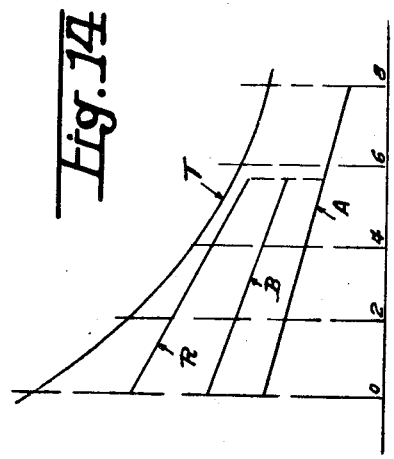
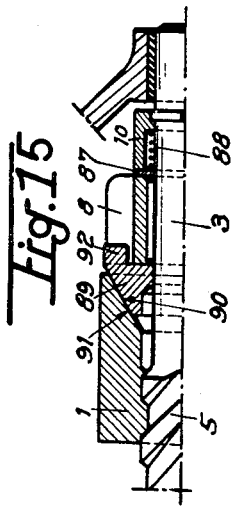
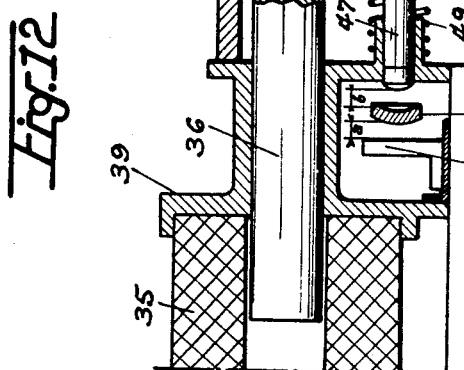
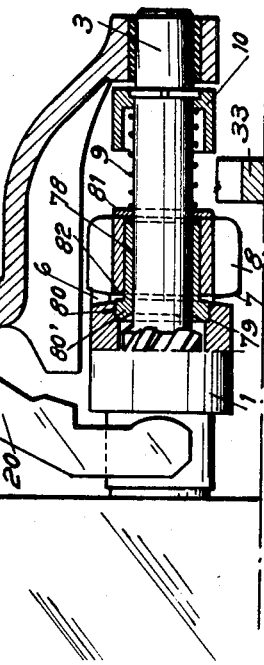
INVENTOR
THEODORE LAFITTE
By Linton and Linton
ATTORNEYS United States Patent Office 2,960,879
Patented Nov. 22, 1960

2,960,879
POSITIVELY OPERATED STARTING DEVICE FOR STARTING MOTORS

Théodore Lafitte, 2 Villa Niel, Paris 17, France

Filed Oct. 1, 1957, Ser. No. 687,522

Claims priority, application France Oct. 13, 1956

4 Claims. (Cl. 74—6)

This invention relates to the starting of internal combustion engines, and more particularly to a positively operated starter, comprising a special control of the kind in which a pinion mounted on the shaft of an electric motor, meshes, by longitudinal displacement, with a tooth wheel integral with the motor to be started.

It has for its object to provide an apparatus reliable in use, having reduced overall length and weight, comprising a small number of members simple and robust, easy to machine, of a low cost price, and requiring a minimum amount of materials.

It has also for its object to provide a simple control device requiring a low stress, and providing for an easy and safe meshing of the various gears thereof.

Other features of the present invention will become clear on reading the following description with reference to the accompanying drawings, showing by way of example, without limiting the scope of the invention, one embodiment of the starter according to the present invention.

On these drawings:

Fig. 5 shows the starter during one operating stage;

Fig. 6 shows the starter position in another position;

Figs. 7 and 8 show modifications of the control device of Fig. 1;

Fig. 9 is a further modification of the control device of the starter;

Figs. 10 and 11 show one example of a device provided with vibrating blades;

Fig. 12 is a longitudinal sectional view of a modification of the starter and of the contactor;

Fig. 13 is a sectional view in plane of the contactor of the arrangement of Fig. 12;

Fig. 14 is a diagrammatic view of the spring loadings and of the attraction curve of the solenoid for Fig. 12, wherein the clearances are shown as abscissas and the attraction torque as ordinates;

Fig. 15 is a longitudinal section of one modified embodiment with a conical friction driving; and Fig. 16 shows for another modification in its upper half-section another variant of the starter in the starting position thereof, and in its lower half-section the device in operation with a free wheel.

Figure 1:
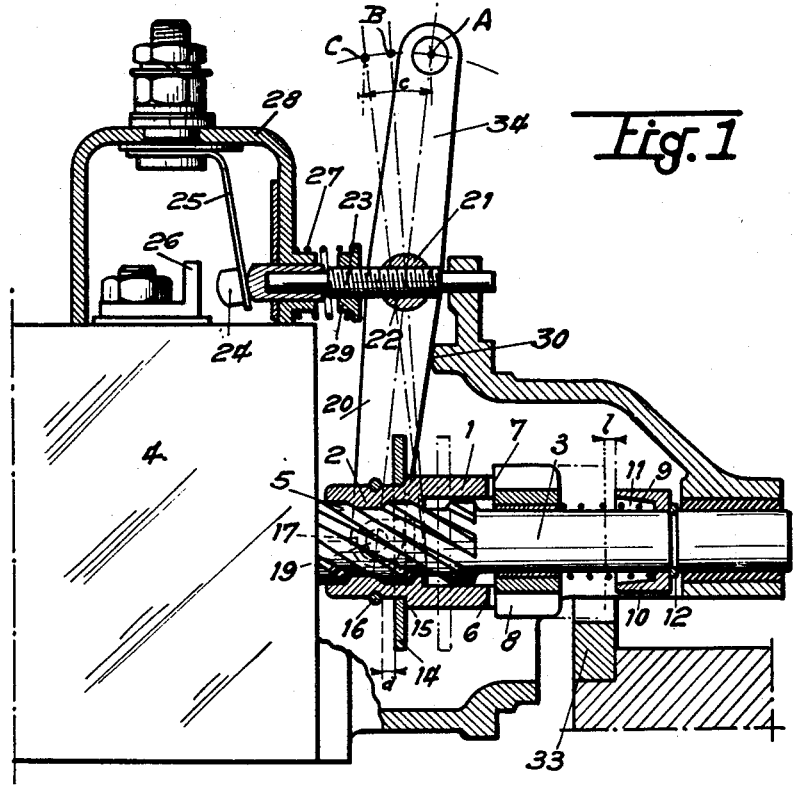
Figs. 1, 2, 3 and 4 are longitudinal section views of the starter, certain details thereof and its control in non-operating position.
Figure 2:
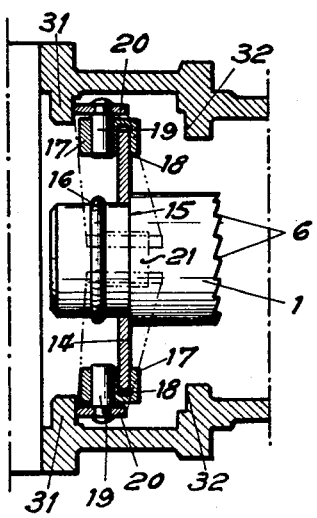
Figure 3:
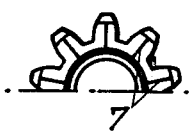
Figure 4:
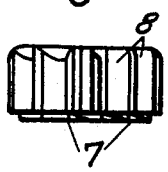

On Figures 1, 2, 3 and 4 the starter comprises a driving sleeve or gland 1, provided with helical grooves 2, which may slide on the shaft 3 of the electric motor 4, provided with helical grooves 5 having corresponding threads. These helical grooves permit a longitudinal displacement of the gland, as well as its driving rotation.

At the end of the sleeve or gland 1, are machined teeth or cogs 6, the number of which is a multiple, preferably the double, of the number of teeth or cogs on the driving pinion gear 8, which carries cogs 7 of the same kind, in the axis or in the vicinity of the axis of said cogs 6, along the whole or a part of their height, thus providing for a drive with a sufficient diameter; the cogs 6 and 7 may be fitted into one another and form a ratchet enabling the gland 1 and the pinion 8 to be made one unit for one direction of rotation. The pinion 8 is provided with a bush-bearing, which may slide and rotate on the smooth portion of shaft 3, in the center of which there is a spring 9 acting on the pinion 8 in abutting relationship with a stop 10, comprising a recess 11, into which the compressed spring 9 may be forced; the stop 10 is locked in a suitable position either by way of a ring 12 or by any appropriate means.

A disc 14 may slide, with a sufficient clearance on the sleeve or gland 1, and abut on one side against a boss 15 provided on the gland 1 and on the other side against a ring 16 situated in such a way that a longitudinal displacement of magnitude $d$ is rendered possible. This disc 14, having parallel faces is controlled by means of blocks 17, by which it is capped by a mortise 18, and is joined to nipples 19, riveted on the control lever or swingle fork 20 which is journaled about the spindle 21, provided with a tapped hole 22 into which is screwed the push rod 23 acting on the contact bead 24, resiliently mounted by means of a blade 25 and able to come into contact with the electrical contact carrying member 26, in order to provide for the connecting the current supply into the electric motor 4. The control lever or swingle fork 20 is extended by means of an arm 34, which may be controlled either by hand or by a solenoid (not shown) as will be explained further.

A suitable loaded spring 27 bears on the casing 28 of the contact carrying members 24 and 26, and pushes the disc 29, suitably screwed on the pusher 23, so as to return the swingle fork 20 into its non-operating position A, on the stops 30 and 31. In this position, the sleeve or gland 1 and the pinion 8 are pushed against the disc 14 by the spring 9 holding the assembly under sufficient tension. A stop 2 is adjusted to lock in the B position, the control lever or swingle fork 20 when it controls the disc 14.

The cogs of pinion 8 will be arranged at a suitable distance from the teeth of the ring gear or wheel 33, fixed to the motor.

The pinion 8 and the ring gear or wheel 33 are provided with conventional tooth inlets.

The operation of the device is as follows:

*1st case.*—Cogs of the pinion 8 and of the wheel 33 are in a meshing position.

In this case, if a push or a traction is exerted on the arm 34, the control lever or swingle fork 20 rocks about the spindle 21 and passes from the A to the B position, in which the pinion cogs 8 are engaged with the cogs of the ring gear or wheel 33, until the disc 14, for example, abuts on the stop 32. During this rocking, the gland 1 and the pinion 8 are brought through the compression of the spring 9 to a distance $l$ less than $d$ from the stop 10, as shown on Figs. 1 and 5. If the push or the traction on the arm 34 is continued, the control lever or swingle fork 20 becomes articulated in relation to the nipples 19, compresses the spring 27 and drives the push rod 23 which pushes the contact bearing member 24 bringing it into contact with the member 26, thus reaching a C position; the electric motor 4 receives current and has rotation imparted thereto, for example in a clockwise direction, when looking at the device from the end thereof.

The threads of the helical grooves 2 and 5 are in this case right-hand ones, and the gland 1 is pushed, acting on the pinion 8 which is directed towards the stop 10, while compressing the spring 9 which enters into the recess 11. The shaft 3 of the motor 4, through the action of its helical grooves, can drive the gland 1, and by means of the cogs 6 and 7 the pinion gear 8 suitably meshed on the ring gear or wheel 33, causes the motor to start in rotation. The control lever 20 has successively four points of support constituted by the stop 30, the crown wheel 33, the control device through its inertia, and stop 32.

In the starting stage, the helical grooves act so as to press against the cogs 6 and 7 and the pinion gear 8 between the gland 1 and the stop 10, the strength of this movement being greater when the starting torque is higher; this strength depends also on the angle of inclination of the helical grooves, the tangent of which will form advantageously with the axis of the shaft 3, a selected angle, preferably comprised between 30° and 45°.

Because of this pressure on the cogs, which may be adjusted so as to have always an excess, the cogs 6 and 7 will safely transmit the motor torque.

*2nd case.*—The pinion cogs 8 and the wheel cogs 33 are in an end-abutting relationship as shown on Fig. 6.

In this case, the control lever or swingle fork 20 will first come from the A position to a D position, whereby the cogs of the pinion 8 and of the wheel 33 abut each other (Fig. 6); then the control lever or swingle fork being articulated on the nipples 19, passes into an E position, in which the contact between the members 24 and 26 is established, resulting in the starting of the motor 4 in the rotation of the pinion 8, the cogs of which may then be engaged in the cogs of the wheel 33; however, the spring 27 expands and pushes the push rod 23, thus enabling the contact between the members 24 and 26 to be discontinued; the motor current is cut off, the control lever or swingle fork passes from the E position to an F position, similar to the B position of Fig. 1, or to a neighboring position, depending on the strength of the opposing springs 9 and 27, adjusted to obtain such a result. A further traction or push on the arm 34 will cause again a contact between the members 24 and 26, and therefore the starting of the motor 4, which will rotate the pinion gear 8 and the ring gear or wheel 33, as the case was in the first embodiment of Figs. 1–4.

This kind of swingle control of Fig. 6 has the very important advantage to enable the meshing to be adjusted through the action of the motor, and once the meshing is effected, the current to be cut off and the putting into place of the pinion 8 to be carried out, without being handicapped by the pressure exerted on the cogs by the starting torque of the motor.

Thus the wear and the deterioration of the cog inlets will be substantially decreased; the meshing will remain safe even if the cog inlets are deficient. The strength of the springs may be substantially reduced and the control stroke *c* will be of a small amplitude; the small effort required for the putting into place will permit an easy manual control and will render unnecessary, in some cases, a solenoid, which in any case may be of smaller weight and smaller cost price.

As soon as the motor has started, the wheel 33 becomes a driving wheel, and the assembly: gland 1 and pinion 8, pushed by the spring 9, suitably spaced from the stop 10 by a length *l* and reaching the level of the cogs 6 and 7, has its boss 15 applying on the disc 14 (Fig. 5), so as to define the length *l*; if the disc 14 is held by a continuous and adequate traction or push on the arm 34, the cogs 6 and 7 are displaced to the right while compressing the spring 9, and the pinion 8 rotates freely on the smooth portion of shaft 3.

This displacement will cause a sufficiently audible click to show that the motor has started, such an arrangement being particularly advantageous in the case of silent motors. The discontinuation of the push or traction on the arm 34 will permit the springs 9 and 27 to return the starter into its non-operating position shown on Fig. 1; this will be facilitated by the friction of the ratchet formed by the cogs 6 and 7, said friction tending to screw the sleeve or gland 1 on the shaft 3, as the pinion 8 is under the control of the ring gear or wheel 33.

In its non-operating position, the whole device is resiliently held under tension, thus being prevented from vibrating or from being too noisy, because of the springs 9 and 27 provided for this purpose.

The swingle control between the starter and the contacts of the electric motor, may be differently embodied in relation to Fig. 1; however, all embodiments will always comprise a swingle control or similar device, which will insure, as in the arrangement e.g., a meshing in two stages, as was explained previously with reference to the 2nd case, when the cogs of the pinion and of the wheel were in abutting relationship (Fig. 6).

The starter's control may therefore be provided by any convenient means or any known means without exceeding the scope of the present invention.

Such swingle control permitting to use springs having a small amount of torque and a short stroke, will facilitate the manual control of the starter, from the dashboard, by means of a key and pusher.

In the modification shown on Figs. 7 and 8, there is a provision for a solenoid control 35, into which a core 36 of suitable metal may penetrate to a sufficient extent, and which is displaced in a bore 37, the control lever or swingle fork 20 being suspended and jointed thereto by a spindle 38. Electric current is applied to this solenoid 35 by usual means, being controlled by a switch on the dash-board.

When the current is applied to the solenoid 35, the core 36 is actuated and its displacement controls the swingle fork 20, which acts on the starter as previously described.

In the casing 39, comprising the bore 37, is placed a contactor formed by a contact-bearing member 40, delivering the current into the starter motor 4 and a resilient member 41 discharging the current from the outside in a known manner.

The core end 36 has screwed thereon a rod 42, which passes through the casing 43 from the solenoid 35, and which is manually controlled by any known means (not shown) so as to provide a starter control should the solenoid 35 and the electric equipment thereof fail. For the same purpose, it is possible to arrange a push rod such as 44, guided in a bore provided in the front part 45 of the starter 3, and permitting to actuate the swingle fork from the outside. Thus we have at our disposal two control means for the starter; an electro-magnetic one and an emergency mechanical one.

The casing 39 carries an extension 46 provided with a bore to receive a push rod 47 (in this case made of an insulating material) extending into the casing 39, opposite the resilient member 41, which, suitably insulated, is tightened by a bolt 48 through the casing wall 39 (Fig. 8); this push rod 47 is compressed by a spring 49, centered by a disc 50 in relation to the swingle fork 20 abutting against a stop 51 (Fig. 7) set into a hole provided in the front part 45. This stop 51 permits to regulate the distance *d*, which will be deemed suitable to separate, during the non-operating stage, the members 40 and 41.

The switch in the circuit of solenoid 35 puts the device into non-operative position via springs 49 and 9. The core 36 of the solenoid 35 will have preferably a sufficient weight, so that its inertia should take part in the operation particularly when the cogs of the pinion set and of the wheel 33 are in an end abutting relationship; the contact members 40 and 41, being for the first time in contact, apply the current to the starter and then interrupt the current, while separating themselves by the action of the spring 49. This spring action should be preferably effected before the second displacement of the core 36, the latter inertia being combined with the spring action 49, so as to obtain a suitable shift between the spring action 49 and the displacement of the core 36.

The push rod 47 (Fig. 7) is placed at a distance $a$ from the end of the swingle fork 20 controlling the starter and at a distance $b$ from the axis of the core 36, whereby, if the effort exerted on the control is represented by A, and the effort of the pusher 47 by P, will have the formula $$P = T\frac{a+b}{a}$$

i.e. the effort on the pusher 47 will be greater than the traction or the push on the control, thus enabling a notable decrease of the solenoid size required for a good operation of the device.

On Fig. 8, there is a particular orientation of the resilient member 41, which is perpendicular or substantially perpendicular to the swingle fork 20; such an arrangement permits a sizable saving in height, and reduces the overall size and the weight.

This arrangement insures, from the outside, the tightness of the starter, whatever the control means used for the contactor, and only the current inlets leading to the starter and, eventually, to the solenoid are left outside the arrangement.

It is to be noted that the main members are easily dismantled and replaced, particularly the solenoid 35.

The core 36 of the solenoid, or the slider used instead of the solenoid, may be disposed as a differential piston able to compress, with the differential portion thereof, the air gradually escaping through suitably located calibrated holes. This dash-pot effect will cooperate with the inertia effect earlier described.

The rear stop may be arranged from the intake side of the starter in non-operating position, as a friction member acting as a brake for the rotation of the electric induction motor, when the latter will rotate with the current supply circuit open.

In the modification of Fig. 9, the control lever or swingle fork 20 is suspended, as earlier stated, to the slider 54, similar to the solenoid core 36 (Fig. 7) frictionally displacing in the bore 37 of the contactor-containing casing 39. This slider 54 has an extension 55 on which is placed concentrically a spring 56 which is centered, on the one hand, on a disc 57 screwed by means of a lock-nut 58 on the extension 55 and, on the other hand, on a disc 59 by means of which it abuts the face 60 of the slider 54. A lever 61, pivotally connected by a spindle 62 on the casing 39, carries an embossment, into which enters a screw 34 acting as an adjustable stop, while its other end is connected to an end-cap 64 or the like, operated by way of a cable 65, said control being performed by the user from the dash-board.

The spring 9 maintains, in a non-operative position, the pinion 8 and the driving gland 1 in an abutting relationship with the stop 66 provided on shaft 3. The swingle fork 20 is held by the spring 67 because of the displacement $a$ between stops 68 and 69, which are adjusted in such a way that, in the non-operative position, the extremity 70 of the swingle fork 20 has a slight clearance $e$ in relation to the face 71 of the driving gland 1, on which it presses directly when actuated, so as to bring the gland 1 and the pinion 8 into their meshing position with the wheel 33. In order to limit the displacement length of the swingle fork, its stop will be provided with a rib 72 reinforcing the front side of the starter.

Because of this arrangement, the extremity 70 of the swingle fork 20 is in frictional contact with the face 71 of the gland 1 for a short time only, reducing the wear to a minimum. The normal position of the members is therefore provided for, without any need for regulating, during a long operational period.

The arrangement is very much simplified, as the nipples 19 riveted to the fork 20 may be suppressed, as well as the blocks 17 jointed thereto and the disc 14 providing the driving sleeve or gland with a concentric push (see Fig. 1).

Moreover, this particular arrangement permits for the starting of the device, to have a pre-determined traction torque independent from the one exerted by the driver on the dash-board drawing-slide.

Indeed, the drawing of a cable such as 65, displaces the slider 54 by means of the spring 56, the tension of which defines the limit of the stress exerted on the lever 61. This tension, which may be adjusted by the disc 57 and the lock-nut 58, reaches its maximum when the cogs of the pinion 8 abut the cogs of the wheel 33, and when the lever 61 engages the stop 63 suitably adjusted for this purpose, so that the swingle fork 20 will be submitted to a traction, the amplitude of which may be predetermined, and which is similar to the action of a solenoid.

It has already been stated that the device is advantageous because of the click provoked by the lateral shift of the cogs 6 and 7 (Fig. 1) freely operating, particularly in the case of motors with a silent start. This click being sufficiently audible, the driver will know that the motor has started, thus avoiding an unnecessary operation likely to lead to freezing and breaking of the starter members.

It may be useful to graduate such an audibility either to increase it or to decrease it.

To decrease and deaden the click provoked by a sudden contact between two metal surfaces (embodiment of Figs. 1 to 4), there is threaded a ring 73 (Fig. 9) of a sound-deadening material (plastic celeron, nylon or similar) into the driving gland 1 guided on the shaft 3; this ring 73 has a sufficient thickness to receive the shock of the pinion 8 pushed by the spring 9, when the cogs of the ratchet periodically return to their meshing position.

This shock between two different materials, one of them being sound-deadening, will result in a notably deadened click.

To increase this audibility, there will be added, either to the pinion 8 or to the driving gland 1, one or several vibrating blades, resulting in a higher or lower sonority when the starter operates freely.

In Figs. 10 and 11, such a device is shown provided with vibrating blades.

The driving pinion 8 has an edge 74, against which is locked a metal disc 75, held in place by a ring 76, for instance from this disc extend three vibrating blades such as 77. The disc 75 is sheared along the teeth of the pinion 8, into which it penetrates to be driven in rotation therewith.

During the lateral displacement, the blades 77 are longitudinally actuated by a length equal to the level of the cogs, and driven in rotation at a tempo depending on the angular speed of the pinion 8 and on its relative speed in relation to the gland 1. Thus the blades 77 will vibrate, providing the required tone, in accordance with the size and the kind of the operating members, resulting in an increase of the natural click.

So as to improve the operational safety, provision is made to energize the pinions (8), glands (1), or connected members, as well as the stops of the pinion 8 and of the half-rings of said stops. This energisation being suitably performed, the terminals are arranged as shown on Fig. 9, so that should a spring such as 9 fail, the magnetic attraction will enable the pinions 8 to be driven by glands 1 towards their non-operative position. The energized half-rings and the fact that they have a north-south direction, provide for a maintenance thereof during mounting and dismantling.

In the modified embodiment of Fig. 12, a ring 78 which may rotate and slide on the shaft 3, helps to center the driving gland 1 in relation to the shaft, through light frictional engagement of the shoulder 79 thereof into a bore 80 of said gland.

On the ring 78, there is mounted a driving pinion gear 8 having a clearance permitting its easy rotation; the spring 9, abutting the stop 10, pushes by way of a disc 81, the pinion 8, towards the driving sleeve or gland 1, providing for the meshing of their cogs 6 and 7. The shoulder 79 of the ring 78 has a length less than the distance between the face 82 of the pinion 8 and the bottom 80' of the internal bore 80 in the gland 1; the length of the cylindrical portion of the ring 78 will be less than the length of the internal diameter of pinion 8, so that the disc 81 pushes only the pinion 8, whatever the fluctuation of the ring 78 on shaft 3.

Such an arrangement is advantageous, as it permits a ready selection of materials, the frictional coefficient of which will be more suitable for the rotation of the pinion 8, which will no longer depend on the metal used and the treatment given for the shaft 3 of the starter. For example, the ring 78 may be of steel, which has gone through a special treatment or having a high chrome content, or a special bronze, or preferably nylon or similar product, providing a good frictional contact, not requiring much lubricating, and which insures a notable decrease of the noise as well as a perfectly smooth running.

The ring 78, preferably of a rocking type, can freely rotate on both the shaft 3 and in the pinion 8; it will divide between both these members, its rotating movement provided by the wheel 33, when the latter drives the pinion 8, in accordance with the eventual resistances encountered. Thus, the rotations of each member will decrease and the duration and the safety of operation will be considerably increased.

In the modification shown in Figs. 12, 13 and 14, the touching needle 41 is urged back by way of the action of the spring 83 to the support 84, tightly held by insulating means on the casing 39 and secured thereto by the bolt 85, which conducts current from an electrical source. The touching needle 41 is held at a distance $a$ from the member 40, conducting the current into the starter. The push rod 47, the end of which is at a distance $b$ from the needle 41, is guided in the casing 39, and it pushes via spring 49, the swingle fork 20 to the stop 51, as already stated. The core 36, to which is jointed the fork 20, is engaged into the solenoid 35.

The operation of the arrangement of Figs. 12, 13, 14 is effected as follows:

The solenoid 35 being actuated by usual means, the core 36 is drawn in and it compresses first the spring 49, until that having gone through the stroke $b$, the pusher 47 comes in contact with the needle 41. The core 36 continuing its course, the spring 83 starts acting and tends to oppose its displacement; but as the clearance between the core 36 and the pole of the solenoid 35 has decreased, the attraction force, shaped as curve T (Fig. 14), has rapidly augmented and permits the compression of the spring 83 and its contact with the needle 41 and the member 40, having a large pressure, as the particular clearance has decreased even further and the attraction on core 36 has again augmented. This contact provides for the supply of current inlet into the starter by the nut 85, needle 41 and contact member 40.

When the solenoid effect ceases, the core 36 and the swingle starting fork 20 having followed the motion, are returned towards their starting positions, first by both springs 83 and 49 cooperating in their applied forces, and then, when the needle comes to rest on the support 84, by one single spring 49 which pushes the swingle fork 20 against its stop 51.

After that, when the core 36 is at its maximum clearance position, that is when its attraction is minima, it must overcome only the tension of the support 49, which provides tensions along the straight line A (Fig. 14); then the clearance diminishing, it will have to compress the spring 83 which provides tensions along straight line B; the resultant tension is directed along straight line R, passing below the curve T which is the minimum curve of the attractions of the solenoid 35 on the core 36. This permits to use a minimum solenoid.

Moreover, because of such disposition, a reaction of the springs 49 and 83 is obtained, together acting on the push rod 47 and therefore on the swingle fork 20; this permits a clear contact break and a better efficiency of the control operation, in accordance with the effects earlier described (see second case), when the cogs of the starter pinion and the motor wheel abut, as seen on Fig. 6.

On Fig. 15, we see a longitudinal half-section of a modification of the main device, wherein the clutch controlled by cogs has been replaced by a conical friction clutch. This device is shown in operating position. The pinion 8 is pushed back with interpolation of the disk 87 on the stop 10, in which is compressed the spring 88. This back motion is provoked by the grooves 5, suitably inclined, provided on the shaft 3 of the starter. A ring 89 has a male conical friction surface engaging into a female cone 91, provided in the driving sleeve or gland 1, which may be screwed and unscrewed on the grooves 5. The ring carries nipples 92 which are slit and tongue jointed into the hollow of cogs of pinion 8, on the rear face of which it bears. The ring 89 and the pinion 8 are thus made to move together as a single unit in both directions of rotation.

The operation is similar to the one of the device described in connection with the Figures 1 to 4.

In the operation of Fig. 15, when the pinion 8 offers a resistance to the rotation because of its engagement into the motor wheel, the grooves 5 push back the assembly formed by the gland 1, the ring 89, the pinion 8 and the disk 87 on the stop 10, as shown on Fig. 15. The male conical friction surfaces 90 and the female ones 91 are thus pressed one against the other and creates a friction permitting the transmission of the electric motor torque. The assembly is loosened when the wheel of the motor to be started becomes a driving assembly and drives the pinion 8 which rotates freely on the shaft 3 entraining the ring 89.

The driving torque of this clutch will be regulated in selecting a sufficient diameter and a suitable angle for the friction cone 90, 91 and materials with a high friction coefficient, as well as a sufficient inclination for the grooves 5, which will be designed within the limits of a good reversibility and will have a tangent between 30 and 50°.

In the modification of Fig. 16, the pinion 8 is provided with a conical slit and tongue joint 93, which is a female one, and it may rotate on the oscillating ring 94, which is in turn free to rotate and to slide on the shaft 3 of the starter, on which is centered the stop 10, having a conical male extremity 95 corresponding to the slit and tongue joint 93. The spring 96, concentric with the shaft 3 pushes by way of a disk 97, against the ring 94 which transmits this push to the ring 98 which centers the extremity of the driving gland 1 on the shaft 3. On the disk 97 rests a spring 99 which pushes, to engage the cogs 6 and 7, the pinion 8 onto the driving gland 1.

It may be seen that, when the starter applies the starting force the helical grooves 5 press, with a force which depends on their inclination and on the motor torque, the driving gland 1, the cogs 6 and 7 and the pinion 8, against the conical boss 95 of the stop 10, so that the assembly forms a unit and that this ensemble is centered by the grooves 5, ring 98, the cogs 6 and 7, the cones 93 and 95 and the stop 10 on shaft 3 of the starter. The slit 93 of pinion 8 and the conical extremity 95 on the stop 10 constitute centering surfaces on the respective members.

In this position, it is obvious that the ring 94 has no undue wear, as it does not interfere in the operation and its life is considerably increased. Moreover, the cogs 6 and 7 regularly and normally pressed against one another insure without failure the transmission of the motor torque.

When the force applied by the motor stops, the pinion 8 withdraws leftward by a distance $d$ and is driven by the wheel 33; it rotates freely at a higher speed than the gland 1; the cogs 6 and 7 are periodically spaced apart from their meshing position in compressing the spring 11 the tension of which is determined for optimum result.

It may be seen that a first tension spring may be used, acting only for the return of the starter to its non operative position, and a second spring, the tension of which is especially appropriate for a good free wheel operation. It will be noted, in the embodiment of Figures 1 to 4 that the effect of the spring on the ratchet is high and variable, according to the relative position of the pinion 8 and the wheel 33, while with the arrangement shown on Fig. 16 the effect of the tension of spring 99 remains constant, whatever the position.

Advantageously, the spring may be replaced by a magnetic attraction as has been proposed, or both means may be combined.

It is to be understood that this invention has been described by way of explanation without limitation of the same and that various detail alterations can be made therein without exceeding its scope. It may for example be incorporated as part of known apparatus.

What I claim is:

1. A positively operating starting device for starting internal combustion engines comprising: an electric motor having a shaft, helical grooves on said shaft, a driving sleeve mounted on said shaft with grooves in engagement with the helical grooves of the motor shaft so that the sleeve will be driven by said motor, first gear teeth on the side of said sleeve away from the motor, a driving pinion gear on the shaft of said motor able to rotate freely, second gear teeth on the side of said driving pinion gear toward the motor, said first and second gear teeth constituting a ratchet, said engine having a ring gear able to mesh with said gear teeth on said driving pinion gear, a spring surrounding said shaft and compressed during meshing of said driving pinion gear and said ring gear, a control lever for pushing said sleeve, a spring push rod on which said control lever pivots, electrical contacts closed by said push rod completing a circuit to said motor to provide motive supply current therefor, and a stop provided on the shaft of said electric motor, said stop and said driving pinion gear being provided with corresponding centering surfaces, so that when the motor is operating the pinion gear will center itself and will bear against said stop and as a result of the engagement between said shaft and said sleeve and the coaction between said driving pinion gear and said stop, a strong force will be developed which will keep said ratchet tightly engaged.

2. A positively operating starting device for starting internal combustion engines comprising: an electric motor having a shaft, helical grooves on said shaft, a driving sleeve mounted on said shaft with grooves in engagement with the helical grooves on the shaft of the motor so that said sleeve will be driven by the motor, teeth on the side of the sleeve away from the motor, a driving pinion gear mounted on the shaft of the electric motor and able to rotate freely, second teeth on the side of said driving pinion gear toward the motor, said two series of teeth forming a ratchet, a ring gear susceptible of meshing with the teeth of said driving pinion gear, a spring mounted surrounding the shaft of the electric motor and being compressed during the meshing of the motor pinion with said ring gear, a spring push rod, electrical contacts closed by said push rod to close a circuit to permit the passage of electric current to said motor, a control lever for pushing said sleeve, four points of support employed successively by said control lever of which one point of support forms a seat, a stop provided on the shaft of the motor, said stop and the side of said driving pinion gear which faces said stop being provided with corresponding centering surfaces, said parts being arranged to provide between the pinion gear and said stop, a clearance of length greater than the depth of engagement of the teeth which form the ratchet, with, as a result, the enmeshing without forced pressure of the pinion and of said ring gear, and the operation of said ratchet and also when the electric motor enters into action, the centering and the support of the pinion gear on said stop by virtue of the creation, by action of the helical grooves, of a force of substantial magnitude which causes the energetic pressing together of the parts of the starting device and consequently the pressing together of the ratchet.

3. A device according to claim 1, and vibrating blades mounted on said sleeve for sound producing purposes.

4. A device according to claim 1, the number of teeth on said sleeve being a multiple of the number of teeth on said driving pinion gear.

References Cited in the file of this patent

UNITED STATES PATENTS

| | | |
|---|---|---|
| 1,912,061 | Bertsche | May 30, 1933 |
| 1,942,573 | Sekella | Jan. 9, 1934 |
| 1,974,985 | Cunnius | Sept. 25, 1934 |
| 2,245,436 | Dyer | June 10, 1941 |
| 2,841,988 | Sabatini | July 8, 1958 |

FOREIGN PATENTS

| | | |
|---|---|---|
| 903,051 | Germany | Feb. 1, 1954 |
| 1,091,477 | France | Oct. 27, 1954 |